United States Patent [19]

Taira

[11] Patent Number: 4,469,404
[45] Date of Patent: Sep. 4, 1984

[54] IMAGE POSTURE CONVERTING OPTICAL SYSTEM

[75] Inventor: Akio Taira, Hachiouji, Japan

[73] Assignee: Olympus Optical Co., Ltd., Tokyo, Japan

[21] Appl. No.: 368,804

[22] Filed: Apr. 14, 1982

[30] Foreign Application Priority Data

Apr. 15, 1981 [JP] Japan ................................ 56-56792

[51] Int. Cl.³ .................................................. G02B 5/04
[52] U.S. Cl. ..................................... 350/286; 350/539
[58] Field of Search ........................ 350/286, 287, 539

[56] References Cited

U.S. PATENT DOCUMENTS 3,424,516  1/1969  Snyder .................................. 350/286

OTHER PUBLICATIONS

A. K. Kanjilal, "A Penta Mirror Assembly", J. Opt. (India), vol. 7, No. 3, Jul.-Sep. 1978, pp. 57-60.
D. Durie, "A Compact Derotator Design", Opt. Engineering, vol. 13, No. 1, Jan.-Feb. 1974, pp. 19-22.

Primary Examiner—John K. Corbin
Assistant Examiner—Lynn Vandenburgh
Attorney, Agent, or Firm—Cushman, Darby & Cushman

[57] ABSTRACT

An image posture converting optical system wherein a reflecting surface of a prism for bending a light path is reoriented by a fixed amount to correct an image posture. This optical system is simple in formation, can retain a favorable optical performance and can be made small.

3 Claims, 12 Drawing Figures

IMAGE POSTURE CONVERTING OPTICAL SYSTEM

BACKGROUND OF THE INVENTION (a) Field of the Invention

This invention relates to an image posture converting optical system to be used for microscopes, optical measuring instruments and the like.

(b) Description of the Prior Art

An optical system for variously bending a light path by combining prisms is used for microscopes and optical measuring instruments. In case such optical system is used as an optical system for conducting a light from an objective to a eyepiece, for example, in a microscope, depending on the manner of arranging the prisms, the image will rotate within the visual field of the eyepiece.

A method used conventionally to keep a correct image posture by correcting such rotation of the image has been to rotate by a proper angle an image rotator arranged in a proper position within a light path. In other words, in the prior art, to compensate for the fact that the image as viewed at the eye piece may have a different angular orientation than actual subject matter upon which the optical system is trained, it is conventional to incorporate in the optical system as a distinct element an image rotator, i.e. an element which can be manipulated simply to adjust the angular orientation of the image as viewed at the eye piece until it matches the angular orientation of the actual subject matter being viewed.

However, in such a method, the image rotator is separate from the prisms and reflecting surfaces required to bend the light path and therefore there are defects that the optical system is complicated to manufacture and is large in size. For example, such image rotators as are shown in FIGS. 1 to 3 are provided in the prior art. In the prism in FIG. 1, it is necessary that the light bundle entering the prism should be a parallel light bundle and therefore manufacture of the optical system is complicated. Also, in the prism in FIG. 2, there is a drawback that the prism is so large as to be hard to use. Further, the prism in FIG. 3 has as many as five reflecting surfaces and therefore has a drawback that the optical performance deteriorates.

SUMMARY OF THE INVENTION

Therefore, a primary object of the present invention is to provide an image posture converting optical system wherein such various drawbacks of conventional optical systems of this kind as are described above are overcome.

According to the present invention, this object is attained by forming an image posture converting system wherein two reflecting surfaces are arranged as inclined by predetermined angles respectively to the entrance optical axis and exit optical axis so that, when the incident light is reflected in turn by the two reflecting surfaces and is emitted, the vector of the incident light in the plane perpendicular to the entrance optical axis is rotated by a predetermined angle to the entrance vector in the plane perpendicular to the exit optical axis.

According to a preferred formation of the present invention, the image posture converting optical system is a single prism formed by turning two reflecting surfaces used to bend the light path. Therefore, the image posture converting optical system can be formed to be very compact and can retain a favorable optical performance.

DESCRIPTION OF THE PREFERRED EMBODIMENTS

Figure 1:
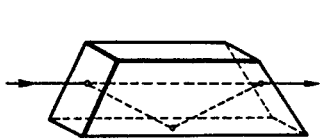
FIGS. 1 to 3 are views showing respective conventionally used image rotators.
Figure 2:
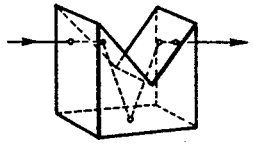
Figure 3:
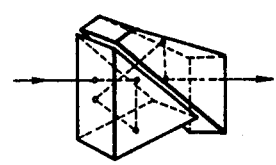
Figure 4A:
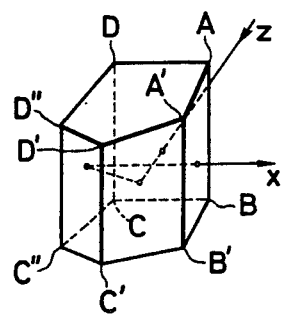
FIGS. 4A to 7B are views showing respective embodiments of the image posture converting optical system according to the present invention.
Figure 4B:
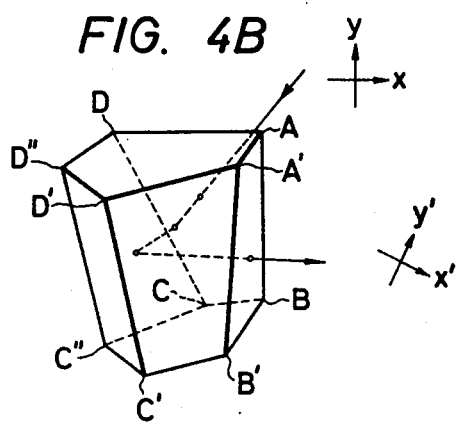
Figure 5A:
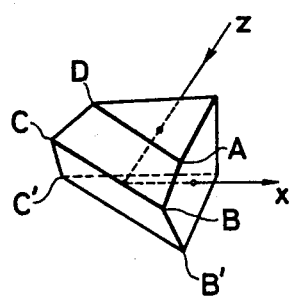
Figure 5B:
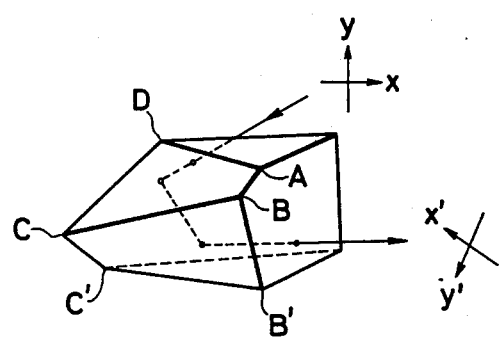
Figure 6A:
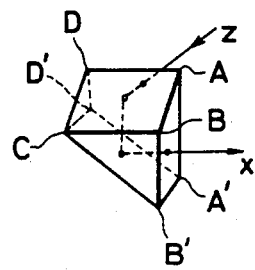
Figure 6B:
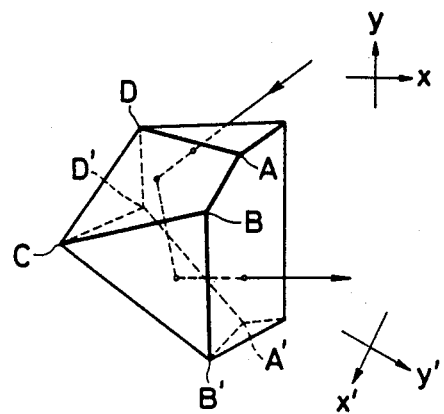
Figure 7A:
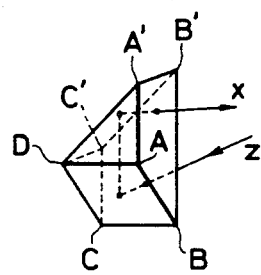
Figure 7B:
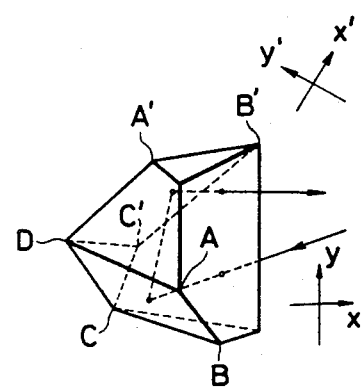

The fundamental idea of the present invention is to correct the image posture by reorienting by a predetermined amount a reflecting surface of one of the same prisms that is used for bending the light path. For example, in FIG. 4A there is shown a prism for bending a light path, that is, an image posture converting optical system. That is to say, the light perpendicularly entering the surface ABCD along the direction indicated by the arrow Z is reflected by the surface A'B'C'D', is further reflected by the surface DCD"D", is emitted vertically out of the surface ABB'A' and is directed in the direction indicated by the arrow X. In this manner, the incident light is bent by 90 degrees. In the present invention, as shown in FIG. 4B, the reflecting surfaces A'B'C'D' and DCC"D" are spatially oriented in proper directions so as to both bend the optical axis by 90 degrees and to rotate the image posture. That is to say, thereby the directions x and y rotate respectively to the directions x' and y'. In the same manner, the reflecting surfaces ABCD and BB'C'C of the prism for bending by 90 degrees such optical axis as is shown in FIG. 5A are spatially reoriented as in FIG. 5B to rotate the image posture. Also, in the prism in FIG. 6A, the reflecting surfaces ABCD and A'B'CD' are spatially reoriented as in FIG. 6B and, in the prism in FIG. 7A, the reflecting surfaces ABCD and A'B'C'D are spatially reoriented as in FIG. 7B.

Thus, in the image posture converting optical system according to the present invention, the reflecting surfaces for bending the light path are designed to simultaneously bend the light path and rotate the image.

How the two reflecting surfaces are to be designed to rotate the image by a predetermined angle in the case of bending such exit optical axis as is shown in FIGS. 4A to 7B by 90 degrees with respect to the entrance optical axis shall be explained in the following.

Figure 8:
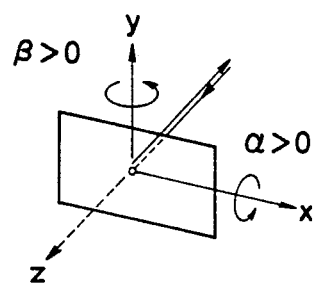
FIG. 8 is a view for explaining the manner of determining angles $\alpha$ and $\beta$ in orienting the reflecting surfaces.

Now, it shall be assumed that, as shown in FIG. 8, the normal vector of the first reflecting surface rotates by the angle $\alpha$ around the axis x from the state coinciding with the axis Z and then by the angle $\beta$ around the axis y and that, as in FIGS. 4A to 7B, the entrance optical axis is the axis Z and the exit optical axis is the axis Z. In the above-mentioned conditions, if the direction cosine of the first reflecting surface is expressed as [cos $\alpha$ sin $\alpha$, sin $\alpha$ and cos $\alpha$ cos $\beta$], if the direction cosine of the second reflecting surface is expressed as [$-k(1+\sin 2\beta \cos^2 \alpha)$, $k\sin 2\alpha \cos \beta$ and $k(1-2\cos^2 \alpha \cdot \cos^2 \beta)$] where $k=\{2(1+\sin 2\beta \cos^2 \alpha)\}-\frac{1}{2}$), when the entrance vector image of the direction (1, 0, 0) perpendicular to the entrance optical axis will become a vector image of (0, $\gamma_2$ and $\gamma_3$) given by the following $\gamma_2$ and $\gamma_3$ after having been reflected by the first and second reflecting surfaces:

$$\gamma_2 = \sin 2\alpha \{\cos \beta(1 - 2 \sin^2 \beta \cos^2 \alpha) + \sin \beta\} + \sin 2\alpha \sin 2\beta \cos \beta \cos^2 \alpha (\cos 2\alpha - 2 \cos^2 \alpha \cos^2 \beta) \cdot (1 + \sin 2\beta \cos^2 \alpha)^{-1}$$

$$\gamma_3 = (1 - 2 \cos^2 \alpha \cos^2 \beta)(1 - 2 \sin^2 \beta \cos^2 \alpha) - \sin 2\beta \cos^2 \alpha + \sin 2\beta \cos^2 \alpha (\cos 2\alpha - \cos^4 \alpha \sin^2 2\beta) \cdot (1 + \sin 2\beta \cos^2 \alpha)^{-1}$$

Therefore, by properly giving the direction $(0, \gamma_2, \gamma_3)$ of the vector image of the exit light, $\alpha$ and $\beta$ can be determined and the first reflecting surface and second reflecting surface can be also determined. However, $\alpha$ and $\beta$ are not determined directly by $\gamma_2$ and $\gamma_3$ because the formula of $\gamma_3(\alpha, \beta)$ is derived from $\gamma_2^2 + \gamma_3^2 = 1$ and $\gamma_2(\alpha, \beta)$ and therefore $\gamma_2$ and $\gamma_3$ can not be used to define $\alpha$ and $\beta$. Therefore, they are determined by giving a proper condition in the design. For example, when the angle between the entrance optical axis (0,0,1) and the reflecting vector of the light along the entrance optical axis (0, 0, 1) reflected on the first reflecting surface is expressed as $\xi$ and the angle between the entrance optical axis (0,0,1) and the exit optical axis (1, 0, 0) is expressed as $\eta$, if $|\xi| = |\eta|$, first and second reflecting surfaces will be formed as are shown respectively in FIGS. 4B, 5B, 6B and 7B. That is to say, in FIG. 4B, $\alpha = -18.969°$ and $\beta = 20.104°$, in FIG. 5B, $\alpha = -38.90°$ and $\beta = -53.794°$, in FIG. 6B, $\alpha = -49.608°$ and $\beta = -16.32°$, and in FIG. 7B $\alpha = 49.608°$ and $\beta = 16.32°$. In such case, the angle of rotation of the exit light with the entrance light will be as schematically shown by x' and y' in the drawings and, when the entrance vector and exit vector are respectively seen along the direction of the progress of the light, in the case of the exit, the image of the entrance vector (1, 0, 0) will be respectively as follows:

In the case of FIG. 4B:
  (0, $-\sin 30°$, $-\cos 30°$),
In the case of FIG. 5B:
  (0, $\sin 30°$, $\cos 30°$),
In the case of FIG. 6B:
  (0, $-\sin 60°$, $-\cos 60°$) and
In the case of FIG. 7B:
  (0, $\sin 60°$, $-\cos 60°$).

As evident from the above explanation, if the vector of the exit light, that is, the angle of rotation of the image of the exit light with the image of the entrance light is determined, the manner of designing the first and second reflecting surfaces, values of $\alpha$ and $\beta$ will be able to be determined automatically.

The above embodiments are of the case that the entrance optical axis and exit optical axis intersect perpendicularly to each other. However, even if they do not intersect perpendicularly to each other, by properly taking the direction cosine of the normal of the second reflecting surface, they will be able to be freely determined with a relatively small area without cutting the entrance light bundle.

I claim:

1. An image posture-converting optical system for interposition in a light path having an entrance optical axis and an exit optical axis in an instance where the light incident upon said path along said entrance optical axis has an entrance vector in a plane perpendicular to said entrance optical axis, and wherein, due to bending of the light as it travels along the light path, the light as viewed at the exit optical axis would, but for conversion, have an exit vector in a plane perpendicular to said exit optical axis which is angularly displaced from said entrance vector, said optical system comprising:

having a first reflecting surface and a second reflecting surface, these two reflecting surfaces being arranged by respective predetermined oblique angles with respect to said entrance optical axis and said exit optical axis so that the entrance vector is rotated by a predetermined non-zero angle in said plane perpendicular to said exit optical axis when the incident light is reflected in turn by said first and second reflecting surfaces.

2. An image posture converting optical system according to claim 1 wherein said entrance optical axis and exit optical axis intersect perpendicularly to each other.

3. An image posture converting optical system according to claim 2 wherein the direction cosine of said first reflecting surface is expressed as $[\cos \alpha \sin \beta, -\sin \alpha, \cos \alpha \cos \beta]$ and the direction cosine of said second reflecting surface is expressed as $[-k(1 + \sin 2\beta \cos^2 \alpha), k \sin 2\alpha \cos \beta, k(1 - 2 \cos^2 \alpha \cos^2 \beta)]$ when said entrance optical axis is made the axis Z, said exit optical axis is made the axis x and the x-y-z coordinate system is made a standard coodinate system, wherein the reference symbol $k = \geq 2(1 + \sin 2\beta \cos^2 \alpha)$, the symbol $\alpha$ represents an angle by which the normal of said first reflecting surface rotates around the axis x from the state coinciding with the axis Z and the symbol $\beta$ represents an angle by which the normal of said first reflecting surface rotates around the axis y after it has been rotated by the angle $\alpha$ around the axis x from the state coinciding with the axis Z.

* * * * *